J. E. COCHRAN.
WEIGHING SCALE.
APPLICATION FILED JULY 5, 1907.
937,767.
Patented Oct. 26, 1909.
3 SHEETS—SHEET 1.
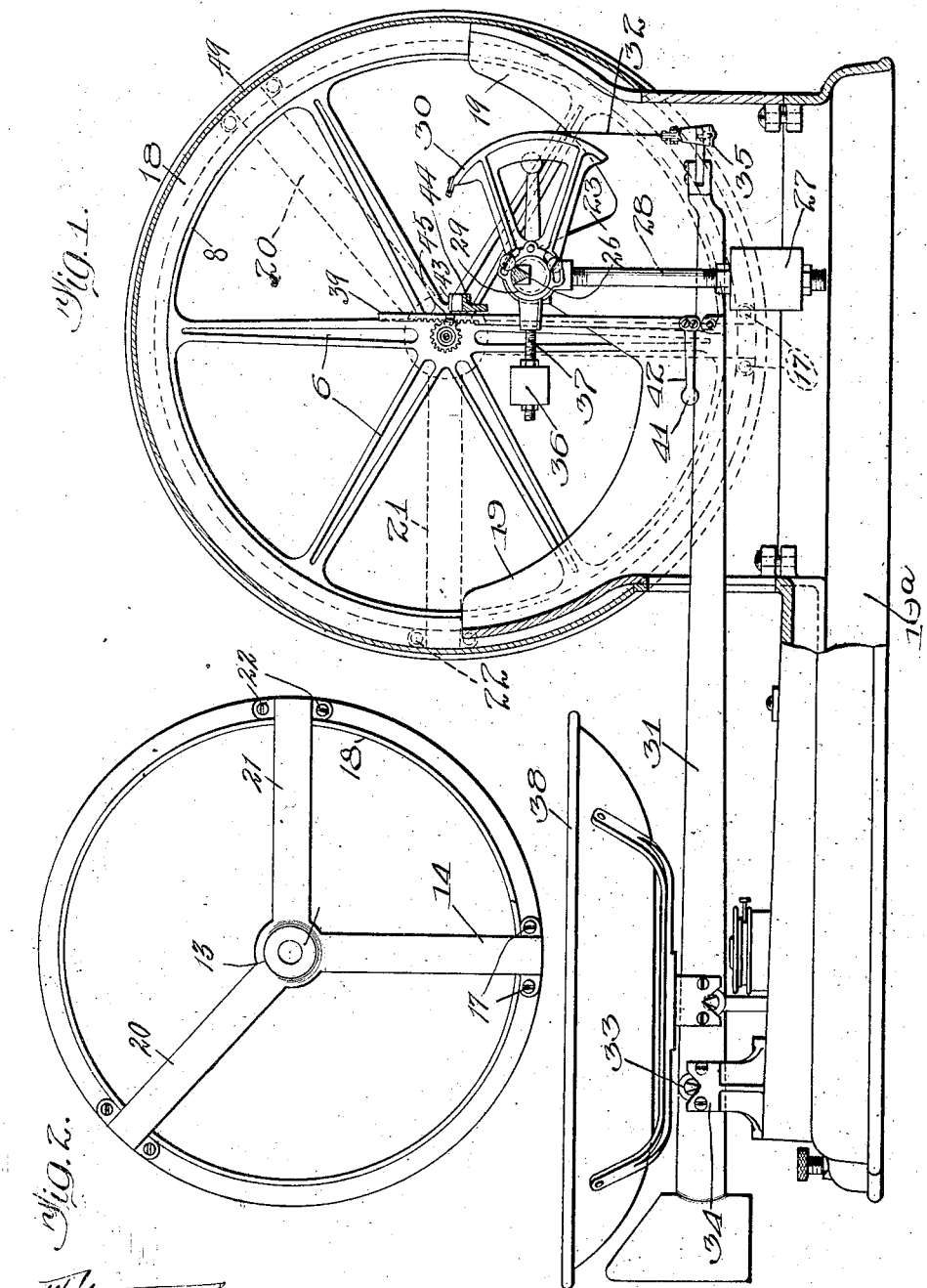

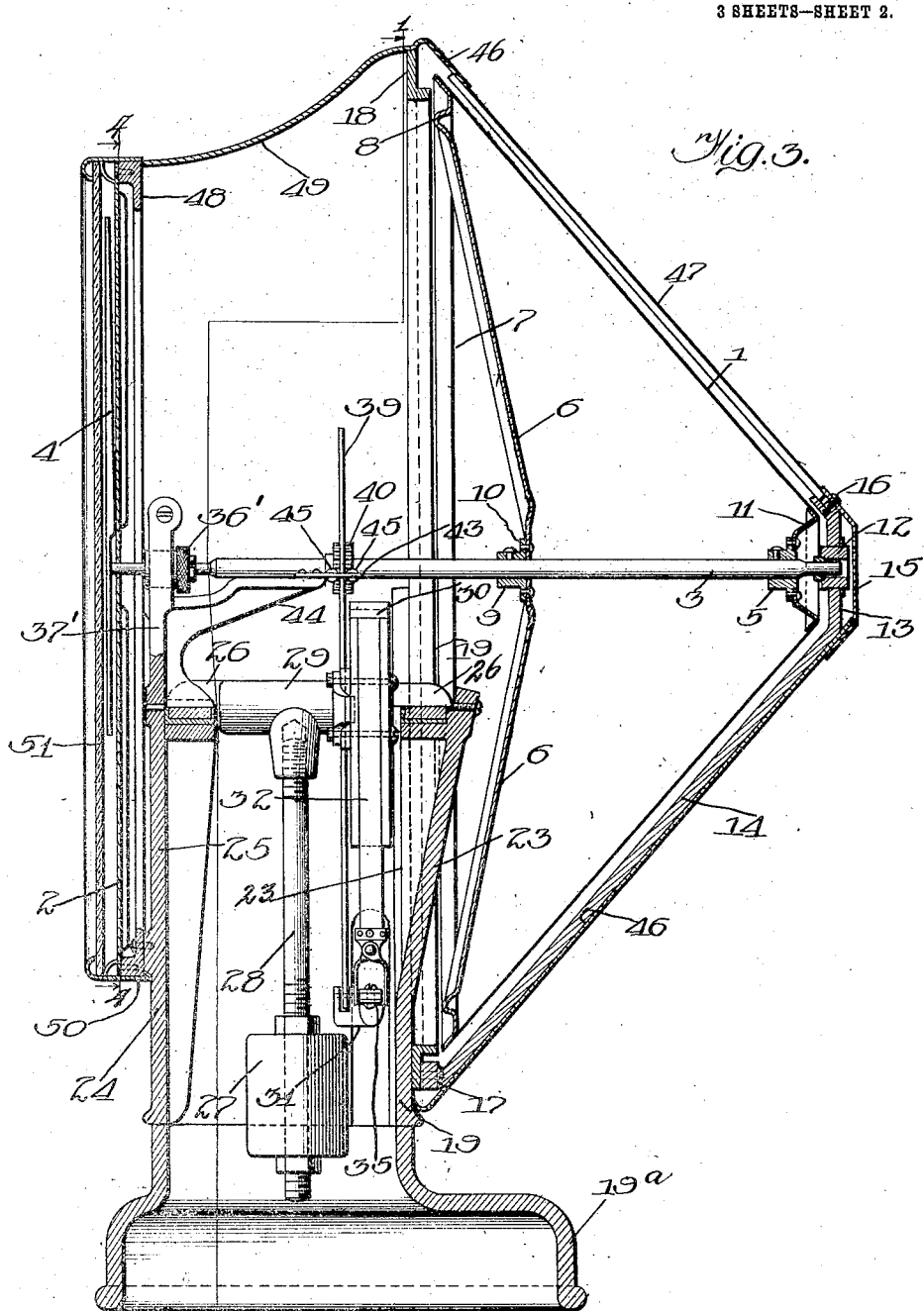

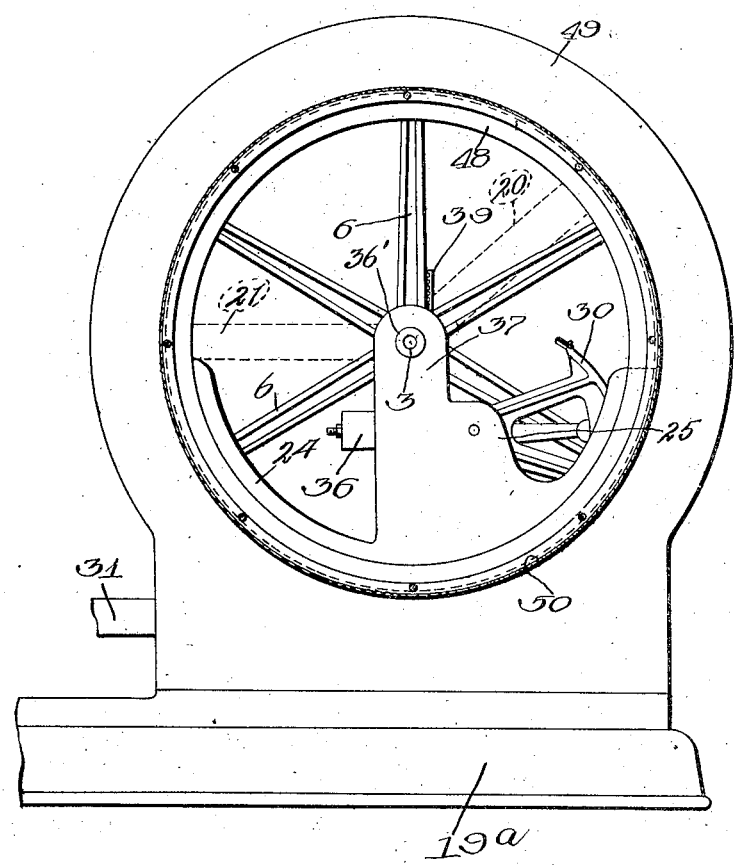

UNITED STATES PATENT OFFICE.

JOSEPH E. COCHRAN, OF ELKHART, INDIANA.

WEIGHING-SCALE.

937,767.  Specification of Letters Patent.  Patented Oct. 26, 1909.

Application filed July 5, 1907. Serial No. 382,242.

*To all whom it may concern:*

Be it known that I, JOSEPH E. COCHRAN, a citizen of the United States, residing at Elkhart, in the county of Elkhart and State of Indiana, have invented certain new and useful Improvements in Weighing-Scales, of which the following is a full, clear, and exact specification.

My invention relates more particularly to that class of weighing scales intended for simultaneously indicating the weight and computing the monetary amount. It has been proposed in weighing scales of this character to employ a dial which is cone shaped because of the greater superficial extent afforded without increasing the diameter, thus giving ample room for the computations while avoiding a structure that is bulky and unwieldy. Users of this class of scales demand that not only shall the computed amount be presented clearly and in position convenient for reading at the user's side of the scale, but that the purchaser shall also be able to readily observe the indicated weight. This makes it necessary to employ a weight dial in addition to the conical computing dial, since the latter is not in position to be observed from the customer's side. The conical dial, however, must rotate in order to bring the matter on the under side to the top where it may be read, but a rotating weight dial for the customer's side is undesirable because of the fact that the average customer has been so long accustomed to the fixed dial and rotating pointer that the reverse arrangement leads to incredulity and requires explanation on the part of the salesman to convince the customer of the accuracy of the mechanism.

My invention is designed to avoid these objections, and therefore has for its primary object to provide a scale which employs both the computing conical dial and the fixed weight dial and which at the same time is simple, compact and of the pendulum-weight and beam type with the minimum number of motion-transmission devices.

With a view to the attainment of these ends and the accomplishment of certain other objects which will hereinafter appear, the invention consists in the features of novelty in the construction, combination and arrangement of parts which will now be described with reference to the accompanying drawings, and then more particularly pointed out in the claims.

In the said drawings—Figure 1 is a rear elevation, partly in vertical longitudinal section, of a weighing scale constructed according to this invention. Fig. 2 is a detail rear elevation of the conical dial casing; and Fig. 3 is an end elevation, with the casing and some of the parts in vertical section, the plane of the section passing through the axis of the dial. Fig. 4 is a detail sectional view on line 4—4 of Fig. 3.

1 is the conical computing dial, and 2 is the fixed weight dial before referred to. The latter is arranged as usual in a vertical plane, while the conical dial is mounted to rotate on a horizontal axis, and to that end is provided with a horizontal shaft 3, which supports and rotates the dial 1 at one end and carries at its other end a pointer or index 4 in appropriate position for reading with reference to the fixed weight dial 2. The index 4 is secured to the shaft 3 in any suitable way, while the cone 2 is mounted upon the shaft by means of a hub 5 at the apex of the cone, and a spider or plurality of spokes 6 at the base of the cone. These spokes are shown as being formed up out of sheet-metal for the sake of lightness, which may be ribbed or corrugated longitudinally of the spokes for the sake of rigidity, and their outer ends may be formed integrally with a rim or ring 7, which is also ribbed as shown at 8 to give it the requisite stiffness. The ring 7 is situated directly at or close to the base of the cone, but the spokes 6 are preferably canted or carried inwardly at their contiguous ends in order that other parts of the mechanism or structure as will be presently described may be located within the space between the base and apex of the cone and thereby considerably reduce the width of the scale as well as shorten the length of the shaft 3, and making it possible to employ a lighter shaft and without the necessity of providing it with an intermediate bearing to resist the vibration likely to be occasioned by the operation of the devices which impart rotation to the cone. The spokes or spiders 6 being of sheet-metal, it is desirable to supply their inner ends with a hub 9 of more substantial body to provide for their attachment to the shaft 3. This hub is shown as being formed with a flange 10, which is riveted or otherwise secured to the central part of the spider into which the spokes are merged. The apex of the cone is provided with an inwardly cupped portion 11, riveted or otherwise secured to the hub 5 through which the end of the shaft projects, and the protruding end of the shaft is mounted in a suitable anti-friction bearing 12, mounted in the upwardly extending end 13 of an arm 14 and inclosed by the cupped portion 11 of an external cap 15 secured to the portion 13 by a screw 16 or other suitable means. The arm 14 is inclined so as to be parallel with the face of the cone, and its inner end is provided with suitable means of attachment such as screws 17, to a ring 18 situated in a vertical plane at the base of the cone. This ring is secured throughout a substantial portion of its lower side to a crescent shaped member 19 of the main base frame of the scale. The arm 14 is also braced and reinforced by one or more additional arms 20, 21 secured by screws 22 or other suitable devices to the ring 18.

Rising from the upper edge of the crescent shaped member 19 is a standard 23, which is inclined inwardly toward the hub 9, while its upper end is between the plane of the base and the apex of the cone, and rising from a similar crescent shaped member 24 on the opposite side of the main frame is a standard 25, and in these two standards is mounted the knife edge pivot 26 of the pendulum weight 27, the latter being adjustably secured to a stem or arm 28, having a hub 29 formed on or secured to the knife edge bearing, all as usual in the pendulum type scale. To one side of the arm 28 is arranged a convolute cam 30 secured to or formed on the hub 29 or otherwise suitably attached to the knife edge bearing 26, the cam being preferably situated between the standard 23 and the arm 28; and arranged directly under the cam 30 and in a plane parallel therewith and also in a plane parallel with the base of the cone, is the main scale beam 31, which is attached to the cone by a ribbon or strip 32 in the usual or any suitable way, the opposite end of the beam being provided with the usual knife edge bearing 34 having pivot upon the main frame. When these parts are in their normal position or with the scale unloaded, the pendulum weight 27 and its arm 28 hang vertically and cross the beam 31 at some distance from its end where the fitting or attachment 35 necessary for its connection to the ribbon 32 is arranged, and when the scale is loaded the pendulum arm and weight swing from this position in a plane parallel with the plane of the base of the cone and the plane of the beam's oscillation in a direction toward the pivot end of the beam where the casing has ample room to permit of this rising and falling motion without the necessity for elongating the casing beyond dimensions otherwise required. It will also be seen that the small adjusting weight 36 and its supporting arm 37 which connects the weight to the hub 29, are situated and oscillate in a plane parallel with the base of the cone and preferably in the same plane as the cam 30. As a consequence, it will be seen that these parts while being situated between the two dials and in close relation to the base of the conical dial nevertheless have ample freedom of movement.

The end of the shaft 3 opposite that supported by the bearing 12 is arranged in a suitable bearing 36, supported on the upper end of a standard 37 formed on the side frame 24 continuous to the standard 25 and preferably in the same plane as the standard 25, so as not to increase the width of the machine in a direction lengthwise of the shaft. It will also be seen that the space between the dials is considerably reduced by carrying the adjacent ends of the spokes 6 inwardly so as to permit the standard 23 to be extended inwardly at its upper end a like extent.

The main base frame 19$^a$ is extended horizontally lengthwise of the beam 31 and in a direction parallel with the plane of the base of the conical dial, as shown in Fig. 1, a sufficient distance to accommodate the beam and the pan or platform 38. The motion of the beam is imparted to the conical dial and to the pointer 4 by means of a rack-bar 39, which is pivotally supported at its lower end upon the beam and engages a pinion 40 secured to the shaft 3 in a position directly above the pinion. It is yieldingly held in engagement with the pinion by a counter-weight 41 on an arm 42 secured to the rack-bar near its lower end and the rack-bar is confined to its position and guided as it moves up and down over the pinion by a guide-plate 43 mounted upon a bracket 44 extended inwardly from the standard 37. If desired, anti-friction rollers 45 may be journaled on the guide-plate 43 on both sides of the rack-bar 39.

It is, of course, preferable to inclose the entire mechanism by means of a suitable casing. To that end the spider construction or plurality of arms 14, 20, 21, is provided with a conical casing 46, which conforms to the shape of the conical dial 1, and the upper side of this casing may be provided with the usual slot 47 through which the dial 1 may be read, the dial 1 being utilized as a computing dial and the various prices will be indicated on the side of the casing adjacent the slot 47 or upon some other suitable part.

Secured to the outer side of the crescent shaped member 24 of the main frame is a ring 48, which is arranged in a vertical plane or parallel with the plane of the base of the cone and the ring 18, and which ring 48 conforms in diameter to the diameter of the dial 2 and to which the dial 2 is secured in any suitable way. The casing 46 may be continued around the ring 48 and also around the ring 48 in the form of an extension 49. The ring 48 projects from the face of the frame member 24 and thereby affords means for the attachment of the ring 50, which holds the glass 51 in place over the dial 2.

With a scale thus constructed, it will be seen that the conical dial being mounted to rotate on a horizontal axis on one side of the scale, is in convenient position to be read by the salesman, while the weight dial 2 is situated on the diametrically opposite side in convenient position to be read with reference to the rotating pointer 4 by the customer, and the width of the scale in a direction lengthwise of the shaft 3 is not materially increased by the employment of this additional dial 2, and in fact by the particular arrangement of the internal mechanism with relation to the conical dial and other parts this width is not as great as it would be in a scale employing a conical dial on a horizontal axis without these improvements. It is also seen that the employment of a conical dial on a horizontal axis provides for a materially increased dial area without materially increasing the height of the scale, and all moving parts being arranged in planes parallel with each other and parallel with the base of the conical dial in position between such base and the fixed dial 2 they are given ample freedom of movement, while the width of the scale in a direction lengthwise of the axis of the dial is not objectionably increased.

In order that the invention might be understood by those skilled in the art, the details of this exemplification thereof have been thus specifically described, but

What I claim as new and desire to secure by Letters Patent, is:

1. In a weighing scale, the combination of a horizontal shaft, a conical dial mounted with its axis horizontal upon said shaft and rotatable thereby, a fixed dial arranged opposite the base of the conical dial and spaced therefrom, a pointer arranged at the outer side of the fixed dial and connected with said shaft, a scale beam situated between said dials and extending in a plane lengthwise of the plane in which the base of the conical dial is situated, a pendulum weight pivoted between said dials on an axis extending lengthwise of said shaft, said weight being oscillatory in a plane between and lengthwise of the fixed dial and the plane in which the base of the conical dial is situated, means operatively connecting the beam with said shaft for rotating it, and means operatively connecting said weight with the beam.

2. In a weighing scale, the combination of a horizontal shaft, a conical dial arranged on a horizontal axis and supported by said shaft, a second dial arranged opposite the base of the first said dial and spaced therefrom, a pointer for the second dial connected to said shaft, an oscillatory scale beam arranged between the said dials and extending horizontally to a point beyond the dials, means for supporting a platform or pan upon the beam at its outer end at a point beyond the dials, a pendulum weight pivoted between the dials to oscillate in a plane lengthwise of said beam and over the plane in which the base of the conical dial is situated, an operative connection between the beam and the shaft for rotating the shaft, and means operatively connecting the beam with said weight.

3. In a weighing scale, the combination of a horizontal shaft, a conical dial supported on one end of said shaft with its axis horizontal, a fixed dial arranged opposite the base of the conical dial and spaced therefrom, a pointer connected with the end of the shaft outside of said fixed dial, a horizontal scale beam extending horizontally between the dials transversely of said shaft, a convolute cam pivotally supported above the beam and in the plane thereof, a flexible connection between the cam and the beam, a pendulum weight connected with the cam and arranged to oscillate in a plane between the dials and parallel with the beam, and an operative connection between the beam and said shaft.

4. In a weighing scale, the combination of a horizontal shaft, a conical dial arranged on a horizontal axis and supported upon said shaft, a fixed dial arranged opposite the base of the conical dial and spaced therefrom, a pointer connected with the shaft adjacent said fixed dial, a standard arranged between the dials for supporting one end of the shaft, an arm arranged at the outer side of the conical dial and supporting the other end of the shaft, a scale beam extending horizontally between the dials transversely of the shaft, a pendulum weight arranged between the dials to oscillate in a plane lengthwise of the beam, an operative connection between the weight and the beam, and means for imparting the movement of the beam to the shaft.

5. In a weighing scale, the combination of a horizontal shaft, a fixed dial arranged opposite the base of the conical dial and spaced therefrom, a pointer connected with the shaft adjacent said fixed dial, a pair of standards disposed between said dials, a pendulum weight pivotally supported upon said standards on an axis parallel with said shaft and adapted to oscillate in a plane substantially parallel with the fixed dial, a scale beam arranged horizontally between the dials and operatively connected with said weight, and means for imparting the movement of the beam to said shaft.

6. In a weighing scale, the combination of a horizontal shaft, a conical dial arranged on a horizontal axis and supported by said shaft, a fixed dial arranged opposite the base of the conical dial and spaced therefrom, the inner side of the conical dial being hollow, a pointer on the shaft adjacent the fixed dial, a scale beam extending horizontally between said dials in a plane lengthwise of the fixed dial, a pendulum weight arranged between the dials to oscillate in a plane lengthwise of the beam, means for supporting said weight extending into the hollow part of the conical dial, means for connecting the weight with the beam, and means for imparting the motion of the beam to said shaft.

7. In a weighing scale, the combination of a horizontal shaft, a conical dial arranged on a horizontal axis and supported upon said shaft and having a hollow inner side, a fixed dial arranged opposite the base of the conical dial and spaced therefrom, a pointer connected with the shaft adjacent said fixed dial, a scale beam projecting between the dials horizontally and in a direction lengthwise of the plane of the fixed dial, a pendulum weight operatively connected with the beam, a standard for supporting said weight, inclined at its upper end into the hollow of the conical dial, and means for imparting the motion of the beam to the shaft.

8. In a weighing scale, the combination of a horizontal shaft, a conical dial having a hollow inner side supported upon the shaft on a horizontal axis, a fixed dial arranged opposite said hollow side and spaced therefrom, a pointer connected with the shaft adjacent said fixed dial, a pair of spaced standards arranged between the dials and one of which inclines into the hollow of the conical dial, a pendulum weight supported from said standards, a scale beam extending horizontally between the dials and arranged between said standards, an operative connection between said weight and the beam, and means for imparting the movement of the beam to the shaft.

9. In a weighing scale, the combination of a horizontal shaft, a conical dial arranged on a horizontal axis upon said shaft and having a hollow inner side, a fixed dial arranged opposite the hollow side of the conical dial and spaced therefrom, a pointer connected with the shaft adjacent said fixed dial, a support for the conical dial on the shaft inclined inwardly away from the fixed dial, a pendulum weight arranged between the dials, a support for said weight inclined inwardly into the hollow of the conical dial, a scale beam arranged horizontally between said dials and operatively connected with said weight, and means for imparting the motion of the beam to said shaft.

10. In a weighing scale, the combination of a horizontal shaft, a conical dial having a hollow inner side arranged on a horizontal axis, the outer end of the apex of the dial being supported upon the shaft, arms connected with the dial contiguous to its base and inclined inwardly toward the apex of the dial and supported upon the shaft, a fixed dial arranged opposite the base of the conical dial and spaced therefrom, a pointer connected to the shaft adjacent said fixed dial, a pendulum weight arranged between the dials, a horizontal scale beam arranged between the dials transversely of said shaft and operatively connected with the weight, and means for imparting the motion of the beam to the shaft.

11. In a weighing scale, the combination of a horizontal shaft, a conical dial arranged on a horizontal axis on said shaft, a fixed dial arranged opposite the base of the conical dial and spaced therefrom, a pointer connected to the shaft adjacent said fixed dial, a convolute cam pivotally supported on a horizontal axis extending lengthwise of the shaft and adapted to oscillate in a plane between said dials lengthwise of the plane of the fixed dial, a pendulum weight depending from said cam between the dials, a scale beam arranged horizontally between the dials and extending across the vertical plane in which the axis of the cam and the said weight are situated, a flexible connection between the free extremity of the scale beam and said cam whereby the depression of the scale beam will cause said weight to swing in a direction away from said connection, and means for imparting the movement of the beam to said shaft.

12. In a weighing scale, the combination of a horizontal shaft, a conical dial supported thereon, a fixed dial arranged opposite the base of the conical dial and spaced therefrom, a hand connected to the shaft adjacent said fixed dial, a base frame, a standard rising from the base frame between the dials for supporting one end of said shaft, an inclined arm rising from the base frame below the lower side of the conical dial and conforming to the surface thereof for supporting the other end of said shaft, a pendulum weight arranged between said standard and the base of the conical dial, a scale beam arranged between the dials and operatively connected with said weight, and means for imparting the movement of the beam to said shaft.

13. In a weighing scale, the combination of a horizontal shaft, a conical dial supported thereon, a fixed dial arranged opposite the base of the conical dial and spaced therefrom, a pointer connected to the shaft adjacent said fixed dial, a ring arranged in a vertical plane at the base of the conical dial, spider arms secured to said ring and having their ends brought together at the apex of the dial for supporting said shaft at one end, a pendulum weight arranged between the dials, a scale beam operatively connected with the weight, and means for imparting the movement of the beam to the shaft.

14. In a weighing scale, the combination of a horizontal shaft, a conical dial supported thereon and having its apex cupped inwardly, a fixed dial arranged opposite the base of the conical dial and spaced therefrom, a pointer connected to the shaft adjacent said fixed dial, a supporting arm for one end of the shaft arranged outside the said conical dial and projecting over the said cupped portion of the dial, a bearing for the said shaft arranged opposite said bearing and cupped portion, a pendulum weight arranged between the dials, a scale beam operatively connected with the weight, and means for imparting the movement of the beam to the shaft.

15. In a weighing scale, the combination of a horizontal shaft, a conical dial arranged on said shaft on a horizontal axis, a fixed dial arranged opposite the base of the conical dial and spaced therefrom, a pointer connected to the shaft adjacent said fixed dial, a base frame, a ring arranged in a vertical plane and secured to one side of the base frame adjacent the base of the conical dial, a casing inclosing the conical dial and supported by said ring, a pendulum weight arranged between the dials, a scale beam operatively connected with said weight, and means for imparting the movement of the beam to said shaft.

16. In a weighing scale, the combination of a horizontal shaft, a conical dial arranged on a horizontal axis on said shaft, a fixed dial arranged opposite the base of the conical dial and spaced therefrom, a pointer connected to the shaft adjacent said fixed dial, a base frame, a standard rising from one side of the base frame between said dials for supporting one end of said shaft, a support rising from the other side of the base frame outside of the conical dial for supporting the other end of the shaft, a pendulum weight arranged between the dials to oscillate in a plane parallel with said fixed dial, a support for said weight situated between the conical dial and the said standard, a scale beam arranged between the dials and operatively connected with the weight, and means for imparting the movement of the beam to said shaft.

17. In a weighing scale, the combination of a horizontal shaft, a conical dial arranged thereon on a horizontal axis, a fixed dial arranged opposite the base of the conical dial and spaced therefrom, a pointer connected to the shaft adjacent said fixed dial, a base frame, a standard rising from one side of the base frame between the dials for supporting one end of said shaft, a support rising from the other side of the base frame in a vertical plane adjacent the base of the conical dial, a casing inclosing the conical dial and supported by said ring, a second ring rising from the base frame adjacent said fixed dial, a casing member supported by said second ring, a pendulum weight arranged between the dials, a scale beam operatively connected with the weight, and means for imparting the movement of the beam to the shaft.

In testimony whereof I have signed my name to this specification, in the presence of two subscribing witnesses, on this first day of July A. D. 1907.

JOSEPH E. COCHRAN.

Witnesses:
LOUISE ROSWELL,
W. R. SCUDDER.